US 6,709,363 B2

(12) United States Patent
Shimabukuro et al.

(10) Patent No.: US 6,709,363 B2
(45) Date of Patent: Mar. 23, 2004

(54) ENGINE RESTART AND VEHICLE START CONTROL APPARATUS IN TRANSMISSION UNIT

(75) Inventors: Eijiro Shimabukuro, Wako (JP); Naohisa Morishita, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 36 days.

(21) Appl. No.: 10/160,054

(22) Filed: Jun. 4, 2002

(65) Prior Publication Data

US 2003/0017912 A1 Jan. 23, 2003

(30) Foreign Application Priority Data

Jul. 18, 2001 (JP) .......................... 2001-218334

(51) Int. Cl.$^7$ ................. B60K 41/04; F16H 61/48
(52) U.S. Cl. ............... 477/115; 477/121; 477/54; 477/61; 701/54
(58) Field of Search ............... 477/115, 121, 477/156, 158, 54, 53, 61; 701/53, 54

(56) References Cited

U.S. PATENT DOCUMENTS

| | | | | |
|---|---|---|---|---|
| 4,923,042 A | * | 5/1990 | Yamabe et al. | 477/54 |
| 5,651,752 A | * | 7/1997 | Wakahara et al. | 477/181 |
| 5,801,499 A | * | 9/1998 | Tsuzuki et al. | 318/141 |
| 6,556,910 B2 | * | 4/2003 | Suzuki et al. | 701/54 |

FOREIGN PATENT DOCUMENTS

| | | |
|---|---|---|
| JP | 11-351372 | 12/1999 |
| JP | 2000-35122 | 2/2000 |

OTHER PUBLICATIONS

U.S. publication to Itou 2002/0117338 A1.*

* cited by examiner

Primary Examiner—Tisha D Lewis
(74) Attorney, Agent, or Firm—Westerman, Hattori, Daniels & Adrian LLP

(57) ABSTRACT

A transmission unit is composed of an engine E, a torque converter TC, and an automatic transmission TM. The engine restart and vehicle start control apparatus comprises an electromagnetic valve capable of calculating the pump impeller suction torque of the torque converter and setting the oil pressure increase ratio for the oil pressure supplied to the vehicle start clutch. When the engine is restarted from an engine stopped state and the vehicle start stage is set by supplying hydraulic oil to a friction engagement element and engaging the friction engagement element, an oil pressure supply increasing at a first oil pressure increase ratio is conducted till the calculated pump impeller suction torque reaches the prescribed criterial value, and an oil pressure supply increasing at a second oil pressure increase ratio which is less than the first oil pressure increase ratio is conducted from the instant the calculated pump impeller suction torque becomes greater than the prescribed criterial value.

5 Claims, 8 Drawing Sheets

ENGINE RESTART AND VEHICLE START CONTROL APPARATUS IN TRANSMISSION UNIT

FIELD OF THE INVENTION

The present invention relates to a transmission unit composed so as to transmit the engine output to a speed change mechanism via a torque converter and having a friction engagement element inside the speed change mechanism, which is engaged and actuated by receiving the hydraulic force when the vehicle is started and sets the vehicle start stage. More specifically, the present invention relates to a vehicle start control apparatus for restarting the engine, which can be stopped under the prescribed conditions, from the state in which the engine was stopped and engaging the friction engagement element and setting the vehicle start stage by supplying hydraulic oil to the friction engagement element.

BACKGROUND OF THE INVENTION

Vehicles in which engine fuel economy can be improved and the amount of exhaust gases and noise can be reduced by conducting control so as to stop the engine when the vehicle is stopped, accelerator throttle is completely closed, and brakes are applied, have been developed and used in practice. Such vehicles are typically controlled so that if the accelerator pedal is stamped on from the state in which the engine was stopped, the engine is immediately restarted and the vehicle is started.

In such vehicles, automatic transmissions have been used as transmission units. In automatic transmissions, a speed change stage is set by a friction engagement element (hydraulic clutch, hydraulic brake, and the like) which receives the oil pressure and is engaged and actuated thereby. However, the friction engagement element is engaged and actuated by receiving the oil pressure from a hydraulic pump impeller driven by an engine, and when the engine is stopped, the oil pressure supplied to the friction engagement element is at a zero level. For this reason, when the engine is restarted and the vehicle is started, the oil pressure from the hydraulic pump impeller rotated by the engine is rapidly supplied to the friction engagement element for setting the vehicle start stage and a control providing for a smooth start of the vehicle is required.

With the foregoing in view, Japanese Patent Application Laid-open No. 11-351372 disclosed a method for a rapid pressure increase control conducted to supply the oil pressure for engaging the clutch for setting the vehicle start stage when the engine is restarted, thereby providing for a vehicle start control without any time delay, and also disclosed a method for changing the implementation mode of the rapid pressure increases control according to the type of the speed change stage serving as a vehicle start stage. Furthermore, Japanese Patent Application Laid-open No. 2000-35122 disclosed a method for a learning control by which when the rapid pressure increase control is thus conducted, a decision is made as to whether the implementation mode thereof is appropriate and the decision content is reflected on the next rapid pressure increase control. The above-mentioned rapid pressure increase control is designed to supply rapidly the hydraulic oil into the oil channel or hydraulic chamber so that the engagement of the friction engagement element can be initiated from the state in which the oil pressure thereof is at a zero level and to transfer the friction engagement element rapidly into a state just before the engagement.

However, the problem was that after the friction engagement element was thus transferred into a state just before the engagement, it was rapidly engaged. As a result, an engagement shock was generated and a smooth vehicle start control could not be conducted. Therefore, it is necessary to select appropriately the increase ratio of the oil pressure supplied to the friction engagement element. In order to suppress the engagement shock, the oil pressure increase ratio has to be decreased. However, if the oil pressure increase ratio is decreased, the engagement time is extended, causing the vehicle start delay. In order to resolve the problem associated with those mutually exclusive requirements, a control method can be considered by which a comparatively high oil pressure increase ratio is set at the initial stage of engagement and the engagement of the initial stage, which is not related to the engagement shock, is conducted at a high speed, but the oil pressure increase ratio is decreased from the stage at which the engagement force greatly increases.

When the engine is restarted and the vehicle start control is conducted, the oil pressure is not supplied to the friction engagement element setting the vehicle start stage immediately after the engine was restarted. Therefore, the input/output rotation speed difference (slip rotation) of the friction engagement element increases according to the increase in the engine rotation speed. If then the engagement of the friction engagement element is initiated, the input/output rotation speed difference gradually switches from the increase to the decrease and eventually becomes zero (full engagement). If a control is conducted so that the oil pressure is initially supplied at a high oil pressure increase ratio and then the increase ratio of the supplied oil pressure is decreased from the instant the engagement force of the friction engagement element increases and the input/output rotation speed difference switches from the increase to the decrease, the shock-free smooth engagement can be conducted without any time delay. However, the problem is that when the input/output rotation speed difference switches from the increase to the decrease, the variation ratio of the rotation speed difference is small. As a result, the instant the rotation speed difference switches from the increase to the decrease is difficult to detect accurately from the rotation speed difference and the control initiation timing of changing (decreasing) the increase ratio of the supplied oil pressure shifts easily.

SUMMARY OF THE INVENTION

It is an object of the present invention to provide an engine restart and vehicle start control apparatus with a structure such that timing of changing the increase ratio of the supplied oil pressure to the friction engagement element for setting the vehicle start stage during engine restarting can be set accurately and the friction engagement element can be engaged without time delay and shocks.

In accordance with the present invention, a transmission unit comprises an engine that can be stop controlled under the prescribed conditions, a torque converter connected to the output shaft of the engine, and a speed change mechanism which is connected to the output shaft of the torque converter and changes the speed and transmits the output rotation thereof, this speed change mechanism comprising a friction engagement element which is engaged and actuated by receiving a hydraulic force when the vehicle is started and sets a vehicle start stage (for example, a LOW clutch). An engine restart and vehicle start control apparatus in this transmission unit comprises pump impeller suction torque calculating means for calculating the pump impeller suction torque of the torque converter and oil pressure supply control means (for example, a control valve CV having an electromagnetic valve for controlling the oil pressure supplied to the LOW clutch) that can set an increase ratio of the oil pressure supplied to the friction engagement element, wherein when the engine is restarted from an engine stopped state and the vehicle start stage is set by supplying a hydraulic fluid to the friction engagement element and engaging the friction engagement element, the oil pressure supply control means conducts oil pressure supply at a first oil pressure increase ratio to the friction engagement element till the calculated pump impeller suction torque reaches a prescribed criterial value, and conducts oil pressure supply at a second oil pressure increase ratio which is less than the first oil pressure increase ratio from the instant the calculated pump impeller suction torque becomes higher than the prescribed criterial value.

In the transmission unit of the above-described structure, the pump impeller suction torque of torque converter is in the action-counteraction relationship with the engagement force of the friction engagement element, and the pump impeller suction torque of torque converter increases with the increase of the clutch engagement force. As a result, when the engine is restarted from an engine stopped state and the vehicle start stage is set by supplying hydraulic fluid to the friction engagement element and engaging the friction engagement element, the instant the friction engagement element moves from the initial engagement state to a state in which the engagement force increases can be determined accurately based on the pump impeller suction torque. With this in view, in accordance with the above-described present invention, a rapid delay-free engagement is performed by conducting the oil pressure supply at a first oil pressure increase ratio (a comparatively high increase ratio is set as this value) to the friction engagement element till the calculated pump impeller suction torque reaches the prescribed criterial value, and the rapid increase in the friction engagement force is suppressed and smooth, shock-free engagement is preformed by conducting the oil pressure supply at a second oil pressure increase ratio which is less than the first oil pressure increase ratio from the instant the calculated pump impeller suction torque becomes higher than the prescribed criterial value (that is, when the engagement force of the friction engagement element greatly increases).

Further, it is preferred that an oil pressure detector for detecting that the oil pressure supplied to the friction engagement element has become a prescribed low pressure is provided and that when the engine is restarted from an engine stopped state and the vehicle start stage is set by supplying hydraulic fluid to the friction engagement element and engaging the friction engagement element, the oil pressure supply control means conducts a control conducting a rapid oil pressure supply to the friction engagement element, for example, by setting the target supply oil pressure to a high pressure till the oil pressure supplied to the friction engagement element detected by the oil pressure detector becomes the prescribed low pressure and conducts an oil pressure supply at the first oil pressure increase ratio to the friction engagement element from the instant the oil pressure detector detects that the oil pressure supplied to the friction engagement element has become the prescribed low pressure. As a result, the friction engagement element can be rapidly set into a state immediately prior to engagement (a state in which the friction engagement element is filled with hydraulic oil to the prescribed low pressure) and the vehicle start control can be conducted without time delay.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by way of illustration only and thus, are not limitative of the present invention.

DESCRIPTION OF THE PREFERRED EMBODIMENT

Figure 1:
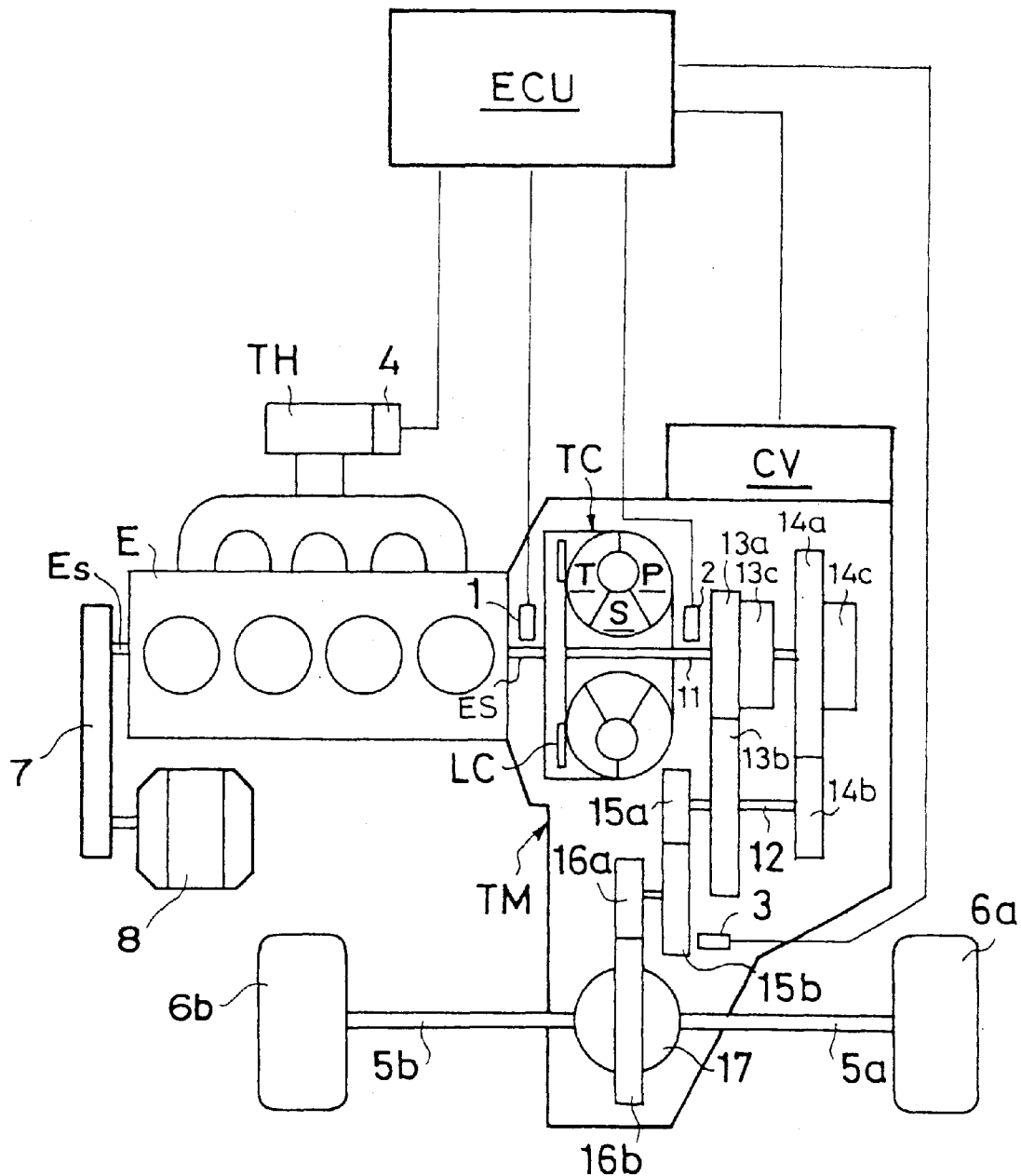
FIG. 1 schematically illustrates the structure of the transmission unit equipped with the engine restart and vehicle start control apparatus in accordance with the present invention.

The preferred embodiments of the present invention will be described below with reference to the appended drawings. The structure of the transmission unit comprising the engine restart propulsion control apparatus in accordance with the present invention is shown in FIG. 1. The transmission unit is composed of a motor generator 8, an engine E, an automatic transmission TM, left and right axle shafts 5a, 5b, and left and right wheels 6a, 6b, and has a structure such that the output rotation of engine E is speed controlled and transmitted from the left and right axle shafts 5a, 5b to the left and right wheels 6a, 6b, thereby driving the wheels. The drive force of motor generator 8 is transmitted to the engine shaft Es via a belt transmission apparatus 7, and the wheels can be driven by the motor generator 8 or the drive force of engine E can be enhanced. Furthermore, during deceleration, electric power can be generated by the motor generator 8 driven by the engine shaft Es.

The automatic transmission TM is connected to engine E, and the rotation of output shaft Es of engine E is transmitted to the automatic transmission TM. The automatic transmission TM is composed of a torque converter TC connected to the output shaft Es of engine E and a gear-type speed change mechanism connected to the output side of torque converter TC. The gear-type speed change mechanism comprises a transmission input shaft 11 connected to the output side of torque converter TC and a transmission counter shaft 12 arranged parallel to the transmission input shaft 11. A plurality of gear rows are disposed between the transmission input shaft 11 and transmission counter shaft 12. Further, the torque converter TC is composed of a pump impeller P, a stator S, and a turbine T and further comprises a lock-up clutch LC that can directly join an input member (pump impeller) and an output member (turbine).

Typically a plurality of gear rows (for example, in the present embodiment, the transmission has speed change stages with five speeds of forward movement, that is, five gear rows) corresponding to speed change stages are provided in transmissions for vehicles. However, to facilitate explanation, only first gear rows 13a, 13b and second gear rows 14a, 14b are shown in the present gear-type speed change mechanism. In those gear rows, the drive gears 13a, 14a are rotatably installed on the gear box input shaft 11 and can be fit onto the gear box input shaft 11 and removed therefrom with the speed change clutches 13c, 14c. Driven gears 13b, 14b engaged with the drive gears 13a, 14a, respectively, are connected to the gear box counter shaft 12. Therefore, transmission can be conducted via either the first gear rows 13a, 13b or second gear rows 14a, 14b by selectively engaging the speed change clutches 13c, 14c. Further, in a state in which both speed change clutches 13c, 14c are released, the gear box is in a neutral state and transmission cannot be conducted between the gear box input shaft 11 and gear box counter shaft 12.

A speed change control valve CV is provided for such engagement control of speed change clutches 13c, 14c. The engagement control of those clutches is conducted by supply control of engagement and actuation oil pressure to the speed change clutches 13c, 14c from the speed change control valve CV. The actuation of speed change control valve CV is controlled by the internal electromagnetic valve. The actuation of the electromagnetic valve is controlled based on the control signals from an electronic control unit ECU and the supply control of engagement and actuation oil pressure to the speed change clutches 13c, 14c. Furthermore, in the automatic transmission TM of the present embodiment, five gear rows are provided for forward movement and automatic speed change of five speeds of forward movement is conducted by selectively using any of those gear rows with the speed change control valve.

An output drive gear 15a is connected to the gear box counter shaft 12, and an output transmission gear row is arranged as shown in the figure, this row comprising an output driven gear 15b engaged with the output drive gear 15a, a final drive gear 16a disposed on the same shaft as the output driven gear 15a and rotating integrally therewith, and a final driven gear 16b engaged with the final drive gear 16a. The final driven gear 16b is provided integrally with a differential mechanism 17, and drive wheels 6a, 6b are connected to the axle shafts 5a, 5b connected to the differential mechanism 17 and extending outwardly.

In the transmission unit of the above-described configuration, a detection signal from a throttle sensor 4 for detecting the throttle aperture θTH of an engine throttle unit TH, a detection signal from the engine rotation sensor 1 for detecting the rotation Ne (that is, input rotation of torque converter TC) of engine output shaft Es, a detection signal from the gear box input rotation sensor 2 for detecting the output rotation (that is, the rotation of gear box input shaft 11) of torque converter TC, and a detection signal from the gear box output rotation sensor 3 detecting the rotation of gear box output shaft 16. Other sensors (for example, a brake pedal sensor, hydraulic switches, and the like) are connected to the electronic control unit ECU (this connection is not shown in the figures) and various detection signals from those signals are input therein.

The electronic control unit ECU not only conducts the automatic speed change control by controlling the actuation of the control valve CV and engaging and releasing the clutches of the gear-type speed change mechanism or conducts the engagement control of lock-up clutch LC, but also stops the engine under the preset conditions and then restarts the engine when the acceleration pedal is stamped on and also conducts a control setting a start stage (for example, a LOW speed change stage) in the automatic transmission TM and starts the vehicle.

Figure 2:
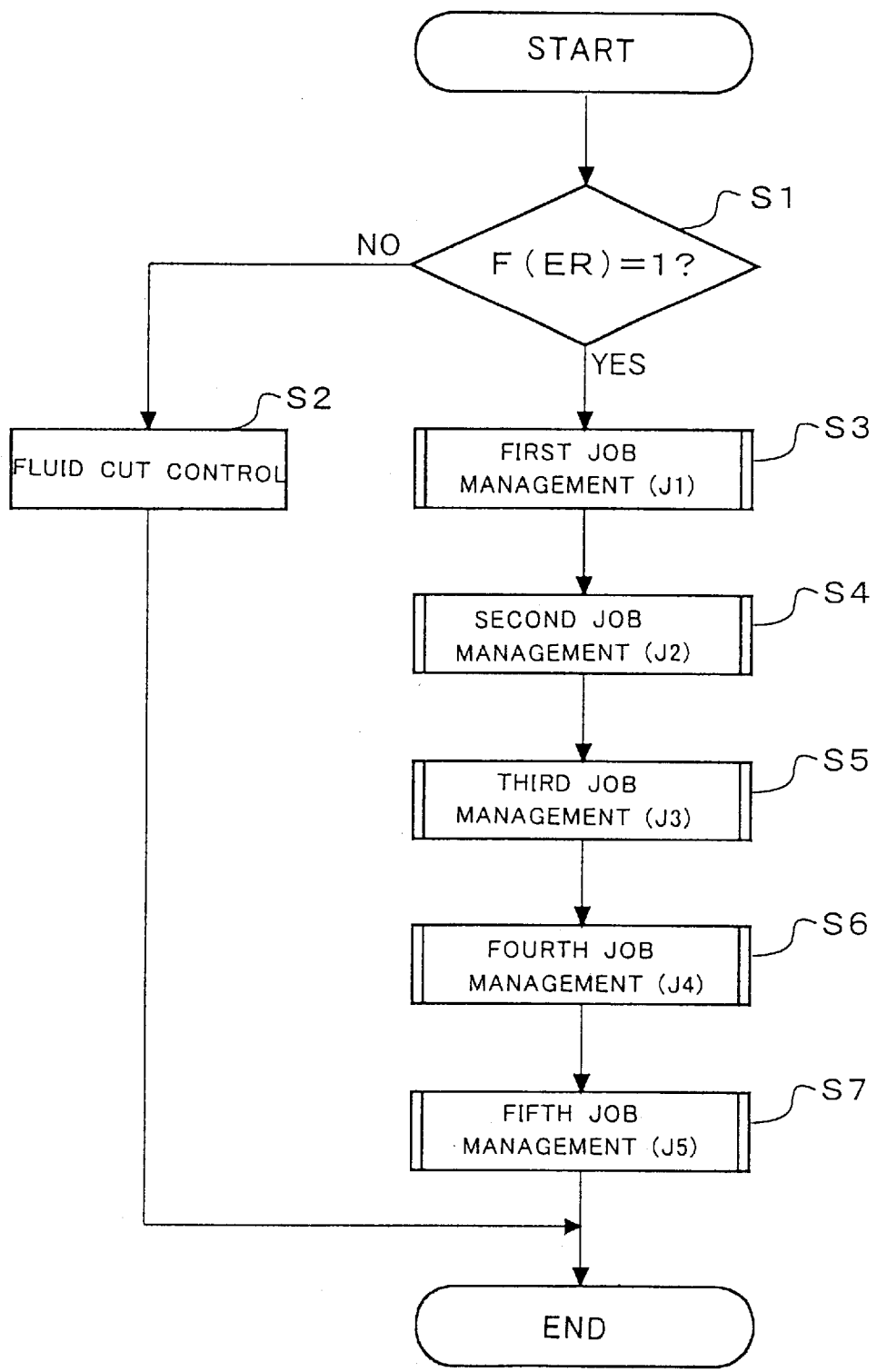
FIG. 2 is a flow chart illustrating the vehicle start clutch engagement control content during engine restart with the above-mentioned engine restart and vehicle start control apparatus.
Figure 3:
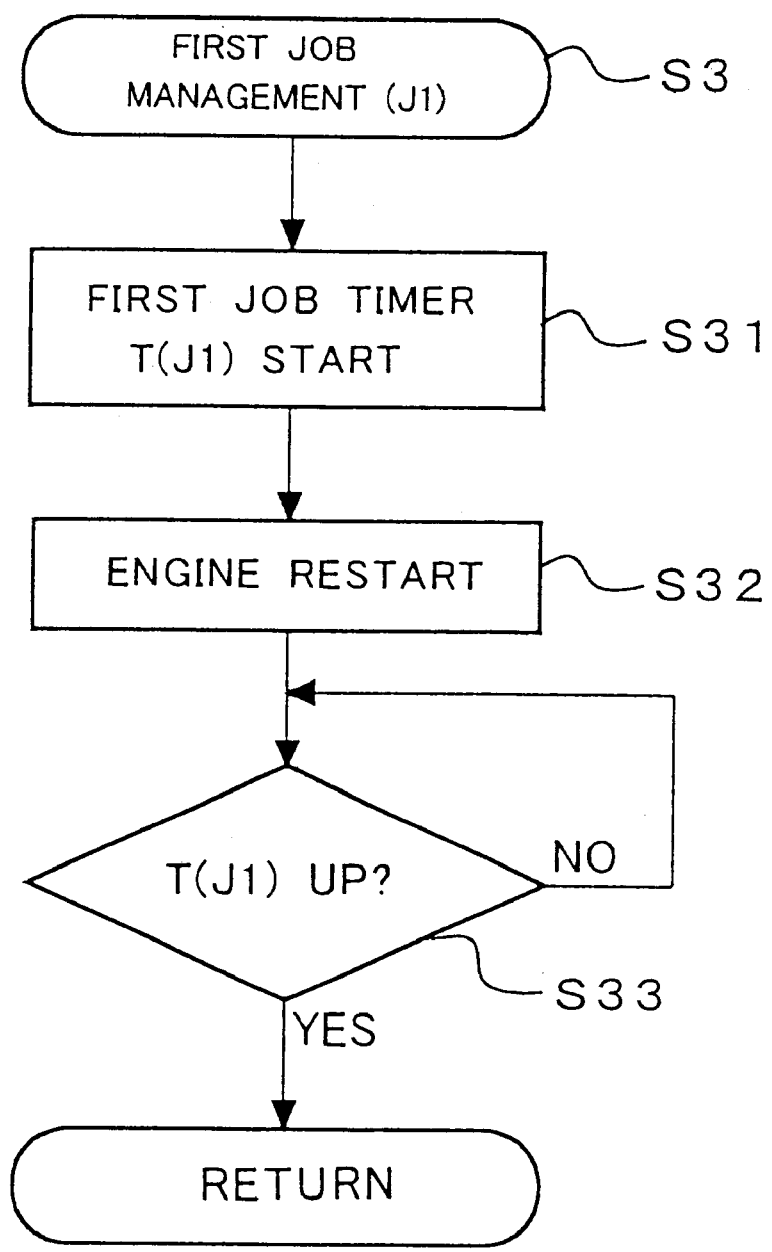
FIG. 3 is a flow chart illustrating in greater detail a part of the control content in the flow chart shown in FIG. 2.

The present invention features a control setting the vehicle start stage in the automatic transmission TM when the engine is thus restarted. Such a control will be described below with reference to flow charts shown in FIG. 2 to FIG. 7 and a time chart shown in FIG. 8. FIG. 2 illustrates the entire control content relating to restarting an engine from a state in which the prescribed engine stop conditions (for example, conditions under which the vehicle is stopped, the brake pedal is stamped on, the acceleration pedal is released, and the acceleration valve is completely closed) are satisfied, the engine fluid cut is conducted, and the engine is stopped. Here, first, a decision is made (step 1) as to whether an engine restart flag F(ER), which is raised when the engine restarting conditions are satisfied, has been raised (is F(ER)=1 or not). If it has not been raised and F(ER)=0, the program proceeds to step S2, the fluid cut is continued, and the engine is maintained in a stop state.

On the other hand, if in step S1 a decision was made that the engine restart flag F(ER)=1, then the first to fifth job management controls J1–J5 shown in steps S3–S7 are conducted sequentially. First, the program initially proceeds to step S3 and the first job management control J1 is conducted. The content thereof is shown in greater detail in FIG. 3. As described above, a first job timer T(J1) is started (step S31) at the instant the engine restart flag F(ER) becomes 1 (moment of time t0 in the time chart shown in FIG. 8), and the engine is restarted (step 32).

Figure 8:
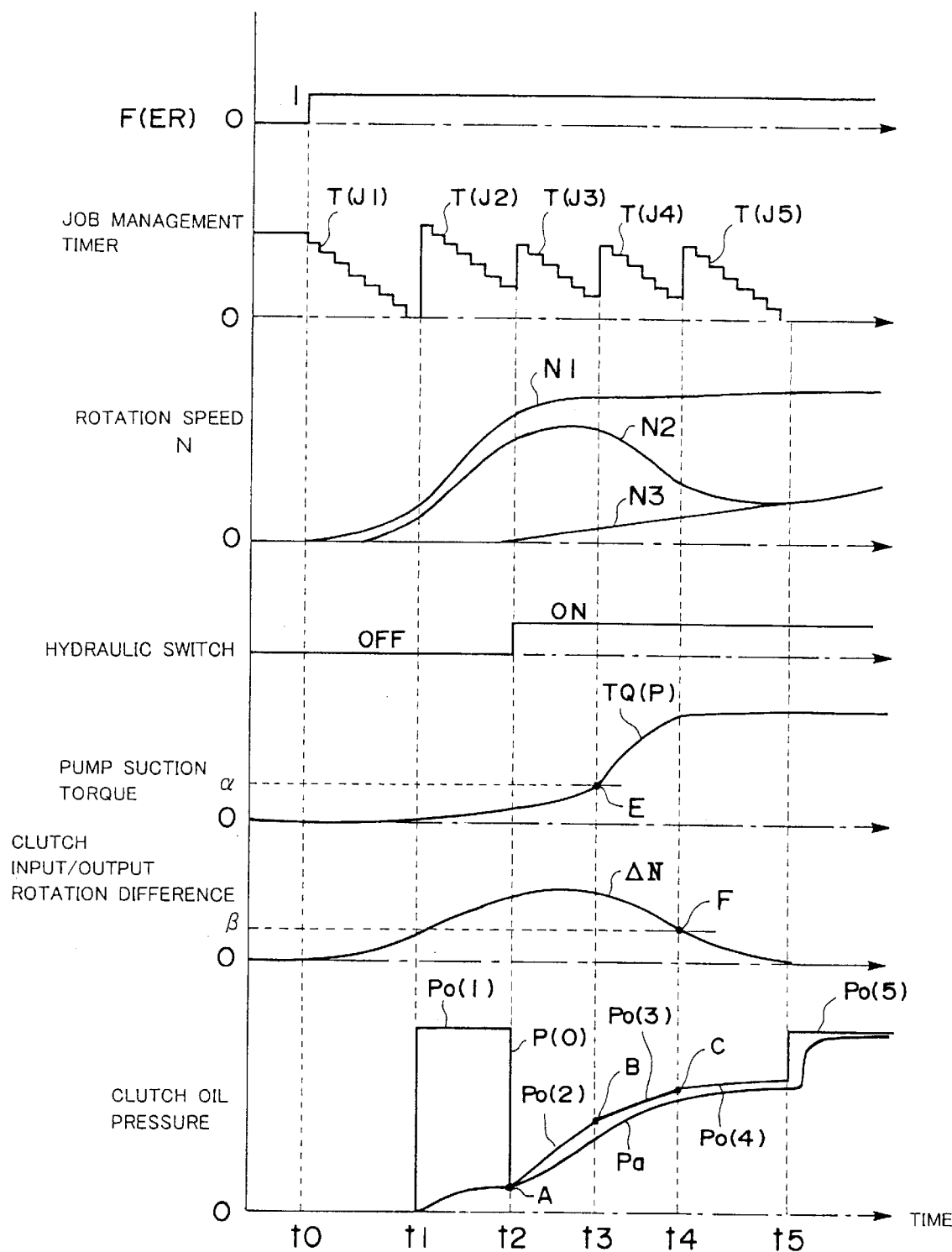
FIG. 8 is a time chart illustrating changes in various parameters with time when the vehicle start clutch engagement control during engine restart is conducted with the above-mentioned engine restart and vehicle start control apparatus.

As a result, the engine output rotation speed (=torque converter input rotation speed, that is, pump impeller rotation speed) N1 shown in FIG. 8 begins to rise as shown in the figure, the torque converter output rotation speed, that is, turbine rotation speed N2, also begins to rise with a slight delay shown in the figure. At this time, the gear box output rotation speed N3 is still zero and the input/output rotation speed difference ΔN of the vehicle start clutch corresponds to the difference between the turbine rotation speed (=gear box input rotation speed) N2 and the gear box output rotation speed N3 and gradually increases according to the increase in the engine rotation speed, as shown in the figure. The first job management control J1 ends at the instant the first job timer T(J1) elapses (up) (time t1 in the time chart) and the program proceeds to the second job management control J2 of step S4.

Figure 4:
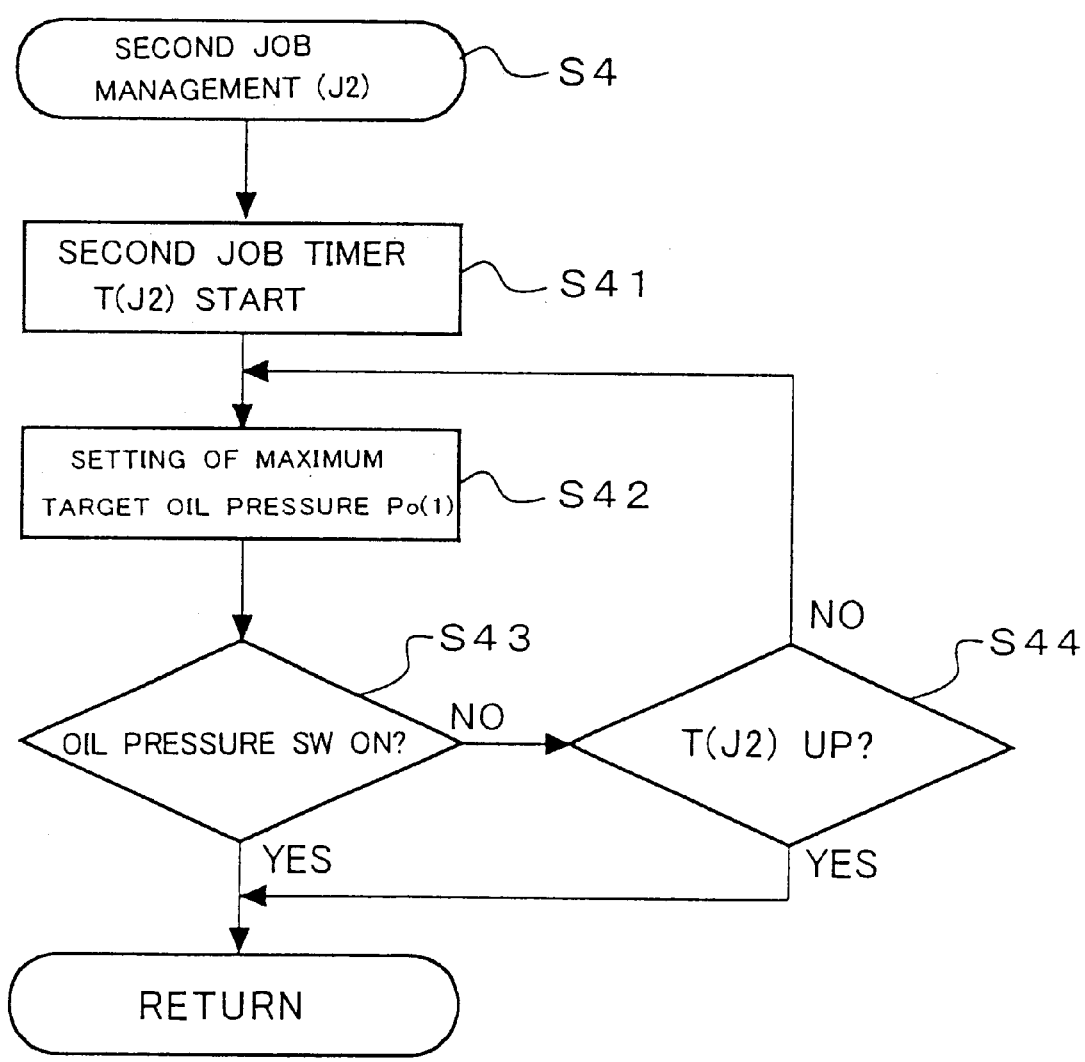
FIG. 4 is a flow chart illustrating in greater detail a part of the control content in the flow chart shown in FIG. 2.

The content of the second job management control J2 is shown in FIG. 4. The program proceeds to the second job management control J2 from the instant (t1) the above-described first job management control J1 has ended, and initially a second job timer T(J2) is started (step S41). At the same time, the target oil pressure supplied to the clutch (friction engagement element) for setting the vehicle start stage (for example, a LOW speed change stage) is set to a maximum oil pressure Po(1) (step 42). This is done by conducting a supply control of engagement and actuation oil pressure to the speed change clutch with an electromagnetic valve, as described in explanation of the structure shown in FIG. 1, and controlling the target oil pressure set by the electromagnetic valve to a maximum oil pressure Po(1). As a result, as shown in FIG. 8, the target oil pressure supplied to the clutch for the vehicle start stage becomes the maximum oil pressure Po(1) and the control is conducted which rapidly supplies the oil pressure to the vehicle start stage. Further, at this time, the real oil pressure Pa in the clutch for the vehicle start stage gradually increases as shown in the figure.

Here, a hydraulic pressure switch is provided which is turned ON when the actual oil pressure Pa supplied to the clutch for the vehicle start stage becomes a predetermined low pressure (oil pressure in point A in FIG. 8). In the second job management control J2, a decision is made as to whether this hydraulic switch is ON (step S43). At the instant it becomes ON (t2), the second job management control J2 is ended and a transition is made to a third job management control J3 of step S5. The control which sets the target oil pressure to the maximum oil pressure Po(1) is continued till the hydraulic switch becomes ON, but at this time, in step S44, the lapse of the second job timer T(J2) is determined and even if the hydraulic switch is not turned ON, the second job management control J2 is ended and a transition is necessarily made to the third job management control J3 of step S5 at the instant the second job timer (J2) elapses.

Figure 5:
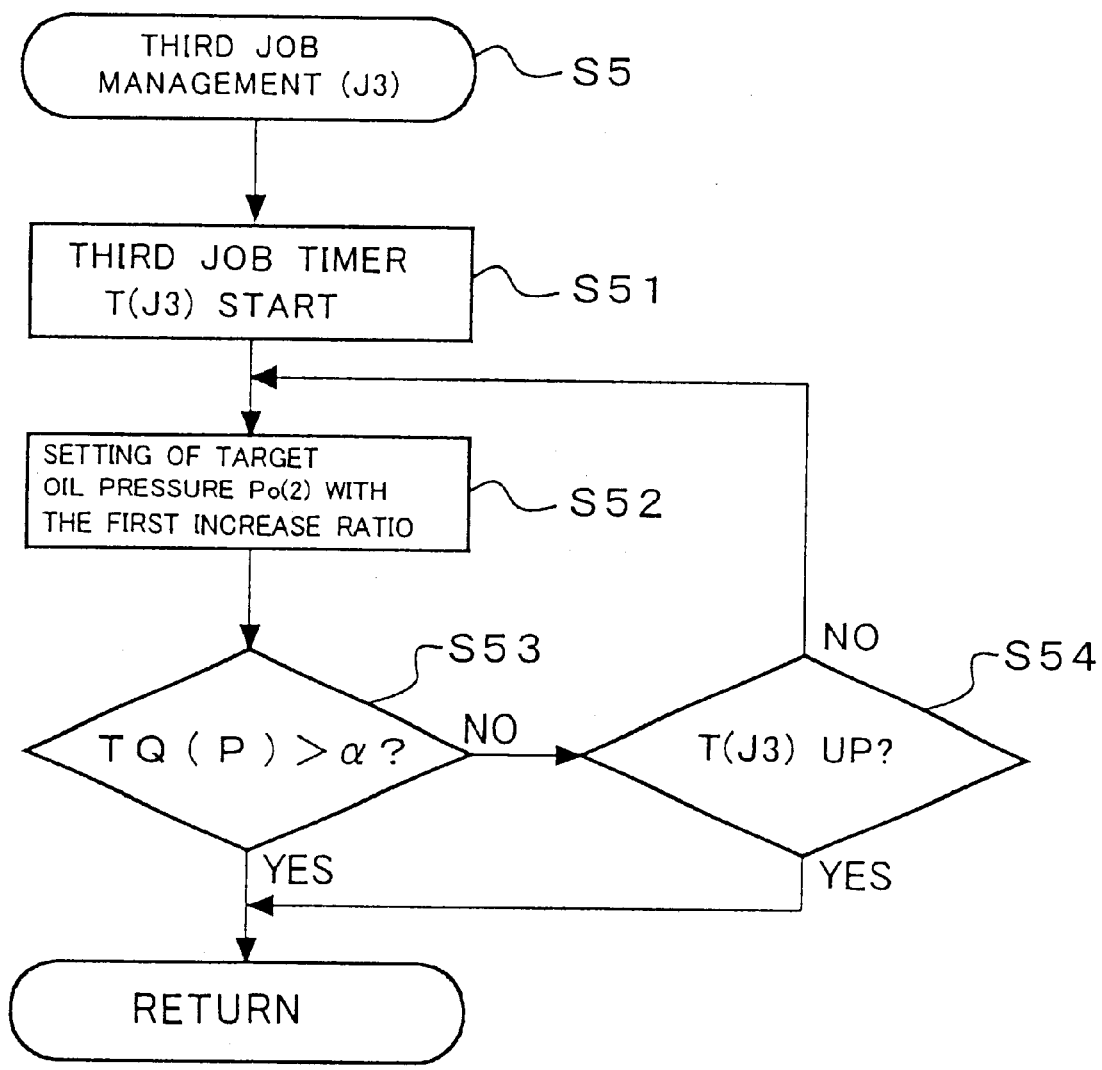
FIG. 5 is a flow chart illustrating in greater detail a part of the control content in the flow chart shown in FIG. 2.

The content of the third job management control J3 is shown in FIG. 5. From the instant (t2) the second job management control J2 is ended, a transition is made to the third job management control J3 and finally the third job timer T(J3) is started (step S51). At the same time, a target oil pressure Po(2) increasing at a first oil pressure increase ratio from the preset low pressure (oil pressure in point A) actuating the hydraulic switch to ON, as shown in FIG. 8, is set (step S52) as the target oil pressure supplied to the clutch for the vehicle start stage (LOW speed change stage). As a result, as shown in FIG. 8, the actual oil pressure Pa supplied to the clutch for the vehicle start stage rises following the target oil pressure Po(2).

The first oil pressure increase ratio set at this time has a comparatively high value and, therefore, the engagement of the clutch for the vehicle start stage is conducted rapidly. However, the problem is that if the engagement control of the clutch for the vehicle start stage is continued at the same first oil pressure increase ratio, the engagement shocks appears. For this reason, the oil pressure supply control at the first oil pressure increase ratio (third job management control J3) is conducted at the initial stage of engagement, and when a transition is made to a state in which the engagement force of the clutch for the vehicle start stage rapidly increases, a transition is made to an oil pressure supply control (fourth job management control J4) conducted at a second oil pressure increase ratio which is less than the first oil pressure increase ratio. In order to evaluate this transition instant, a pump impeller suction torque TQ(P) in pump impeller P of torque converter TC is calculated and in step S53 a decision is made as to whether this pump impeller suction torque TQ(P) has exceeded the prescribed threshold value α (a value at the instant the pump impeller suction torque begins to increase rapidly; pump impeller suction torque in point E in FIG. 8).

Thus, a decision relating to the timing of transition from the oil pressure supply control at a first oil pressure increase ratio (third job management control J3) to the oil pressure supply control at a second oil pressure increase ratio (fourth job management control J4) can be also made from the input/output rotation speed difference ΔN of the clutch. As follows from the time chart shown in FIG. 8, at the time of transition to a state in which the engagement force of the clutch for the vehicle start stage changes rapidly, changes in the input/output rotation speed difference ΔN of the clutch with time are small, and the error of the decision based on the rotation speed difference ΔN increases. On the other hand, the pump impeller suction torque of the torque converter changes according to changes of the engagement force of the clutch for the vehicle start stage and the advantage of the decision based thereon is that the transition timing can be accurately evaluated.

At the instant (t3) the pump impeller suction torque TQ(P) exceeds the prescribed threshold value α, the third job management control J3 is ended and a transition is made to the fourth job management control J4 of step S6. As described above, the pump impeller suction torque TQ(P) is in the action-counteraction relationship with the clutch engagement torque, and setting the timing of transition to the fourth job management control J4 as shown hereinabove makes it possible to cause the transition to the fourth job management control J4 at the instant the engagement torque of the clutch for the start begins to increase rapidly. Furthermore, in this case too, at the instant the third job timer T(J3) has elapsed, the third job management control J3 is ended and a transition is necessarily made to the fourth job management control J4 of step S6, even if the pump impeller suction torque TQ(P) does not exceed the prescribed threshold value α.

Figure 6:
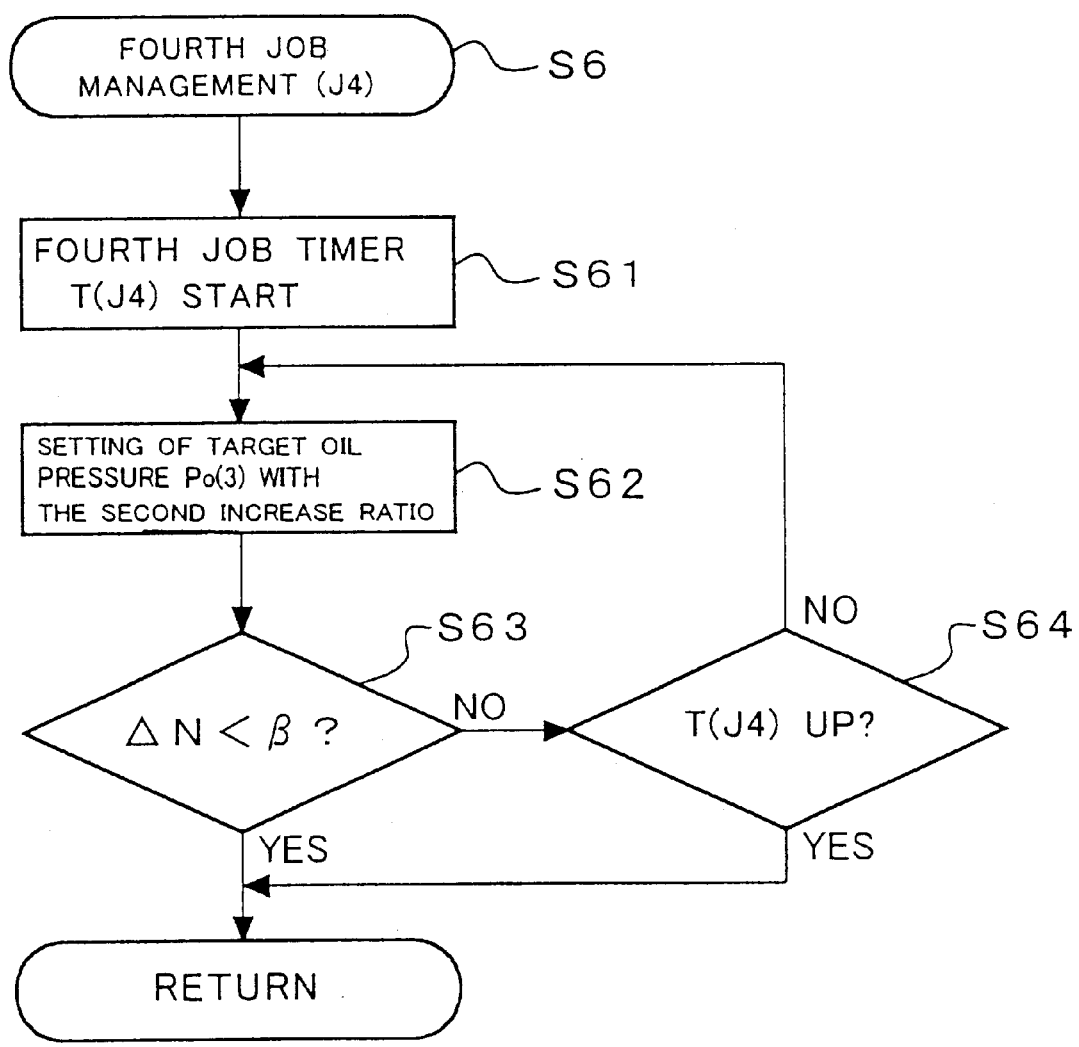
FIG. 6 is a flow chart illustrating in greater detail a part of the control content in the flow chart shown in FIG. 2.

The content of the fourth job management control J4 is shown in FIG. 6. From the instant (t3) the third job management control J3 is ended, a transition is made to the fourth job management control J4 and finally the fourth job timer T(J4) is started (step S61). At the same time, a target oil pressure Po(3) increasing at a second oil pressure increase ratio which is less than the first oil pressure increase ratio is set (step S62) as the target oil pressure supplied to the clutch for the vehicle start stage (LOW speed change stage). As a result, as shown in FIG. 8, the actual oil pressure Pa supplied to the clutch for the vehicle start stage rises following the target oil pressure Po(3).

Thus, the fourth job management control J4 begins from the instant the pump impeller suction torque TQ(P) begins to increase rapidly, that is, from the instant the engagement torque of the clutch for the start begins to increase rapidly. However, at this time, since the target oil pressure Po(3) increasing at a second oil pressure increase ratio which is less than the first oil pressure increase ratio is set, the clutch for the vehicle start stage can be engaged smoothly and without shocks.

Thus, the control providing for smooth engagement of the clutch for the vehicle start stage is continued till the clutch assumes an almost engaged state. A decision as to whether the clutch is almost engaged is made (step S63) by deciding as to whether the input/output rotation speed difference ΔN of the clutch is less than the prescribed value β. At the instant the rotation speed difference ΔN becomes less than β (t4), the fourth job management control J4 is ended and a transition is made to the job management control J5 of step S7. In this case too, at the instant the fourth job timer T(J4) elapses, the fourth job management control J4 is ended and a transition is necessarily made to the fifth job management control J5 of step S7, even if the rotation speed difference ΔN does not become less than β.

Figure 7:
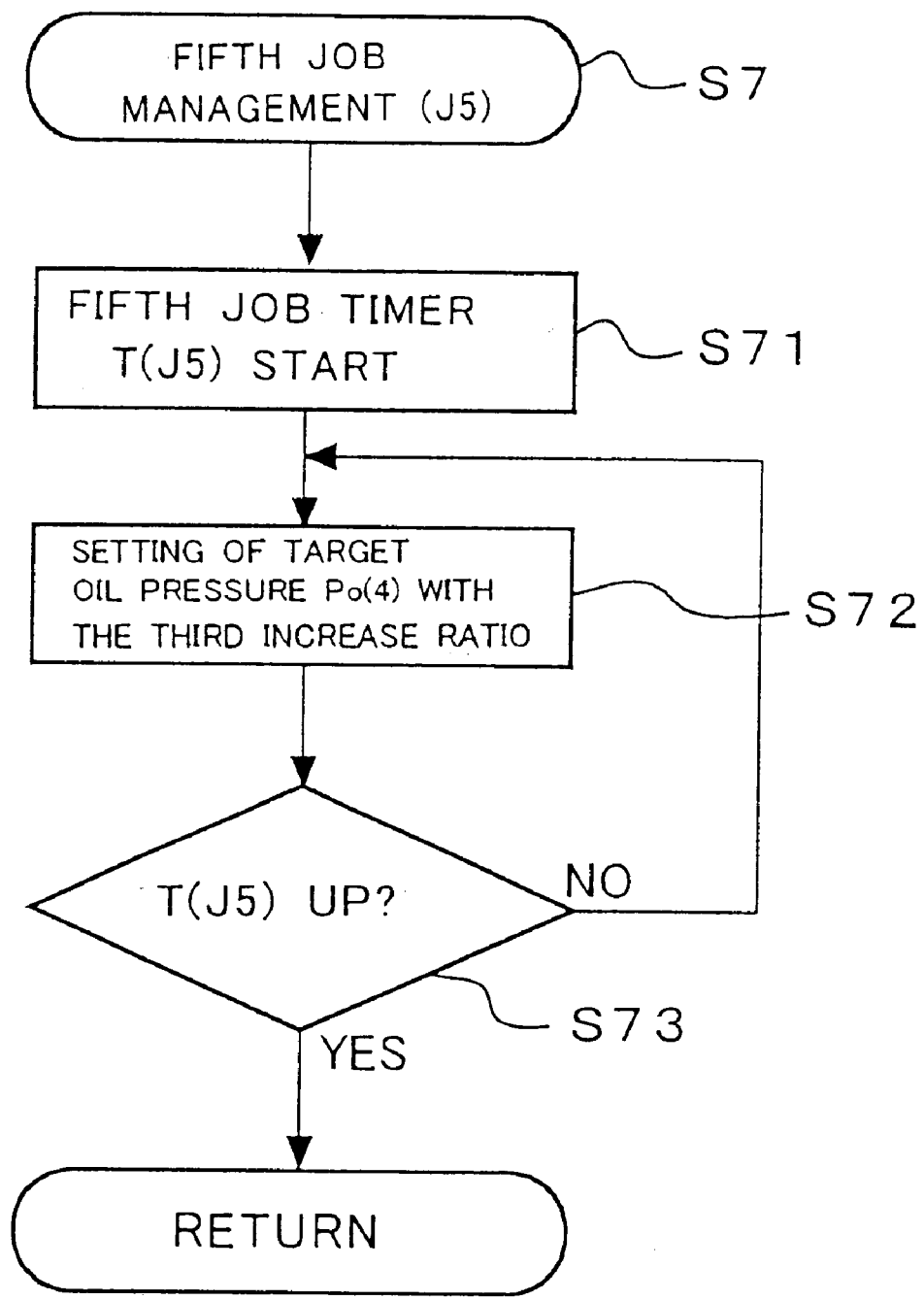
FIG. 7 is a flow chart illustrating in greater detail a part of the control content in the flow chart shown in FIG. 2.

The content of the fifth job management control J5 is shown in FIG. 7. From the instant (t4) the fourth job management control J4 is ended, a transition is made to the fifth job management control J5 and finally the fifth job timer T(J5) is started (step S71). At the same time, a target oil pressure Po(4) increasing at a third oil pressure increase ratio which is less than the second oil pressure increase ratio is set (step S72) as the target oil pressure supplied to the clutch for the vehicle start stage (LOW speed change stage). As a result, as shown in FIG. 8, the actual oil pressure Pa supplied to the clutch for the vehicle start stage rises following the target oil pressure Po(4), the clutch engagement proceeds, the clutch input/output rotation speed difference ΔN becomes zero, and the clutch is fully engaged.

The fifth job timer T(J5) is set to a time which is assumed to be necessary for the clutch to be thus fully engaged, and if a decision is made in step S73 that the fifth job timer T(J5) has elapsed, the fifth job management control J5 is ended at this instant (t5), the clutch for the vehicle start stage is maintained in a fully engaged stage, with the clutch target oil pressure being the maximum pressure Po(5), and the control is ended. As a result, when the engine is restarted, the hydraulic oil from the hydraulic pump impeller rotated and driven by the engine is supplied rapidly and without time delay to the clutch for the vehicle start stage and the control is possible which provides for smooth engagement of the clutch and smooth start of the vehicle.

As described above, in accordance with the present invention, when an engine is restarted from an engine stopped state, hydraulic oil is supplied to the friction engagement element, the friction engagement element is engaged, and the vehicle start state is set, the oil pressure supply control means conducts the oil pressure supply at a first oil pressure supply increase ratio to the friction engagement element till the calculated pump impeller suction torque calculated by pump impeller suction torque calculation means reaches the prescribed criterial value. Therefore, rapid and delay-free engagement of the friction engagement element is conducted, the oil pressure supply at a second oil pressure increase ratio which is less than the first oil pressure increase ratio is conducted from the instant the calculated pump impeller suction torque becomes no less than the prescribed criterial value (that is at the instant the engagement force of the friction engagement element greatly increases), rapid increase in the friction engagement force is suppressed, and smooth, shock-free engagement can be conducted. In particular, in accordance with the present invention, the timing of transition from the oil pressure supply at the first oil pressure increase ratio to the oil pressure supply at the second oil pressure increase ratio is determined by judging based on the pump impeller suction torque of the torque converter. Therefore, the timing of transition can be set accurately.

Further, it is preferred that an oil pressure detector for detecting that the oil pressure supplied to the friction engagement element has become the prescribed low pressure be provided and that when the engine is restarted from an engine stopped state and the vehicle start stage is set by supplying hydraulic fluid to the friction engagement element and engaging the friction engagement element, the oil pressure supply control means conducts a control conducting a rapid oil pressure supply to the friction engagement element by setting the target supply oil pressure to a high pressure till the oil pressure supplied to the friction engagement element detected by the oil pressure detector becomes the prescribed low pressure and conducts an oil pressure supply from the prescribed low pressure at the first oil pressure increase ratio to the friction engagement element from the instant the oil pressure detector detects that the oil pressure supplied to the friction engagement element has become the prescribed low pressure. As a result, the friction engagement element can be rapidly set into a state immediately prior to engagement (a state in which the friction engagement element is filled with hydraulic fluid to the prescribed low pressure) and the vehicle start control can be conducted without time delay.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

0RELATED APPLICATIONS

This application claims the priority of Japanese Patent Application No. 2001-218334 filed on Jul. 18, 2001, which is incorporated herein by reference.

What is claimed is:

1. An engine restart and vehicle start control apparatus in a transmission unit comprising an engine that can be stop controlled under prescribed conditions, a torque converter connected to an output shaft of said engine, and a speed change mechanism which is connected to an output shaft of said torque converter and changes the speed and transmits the output rotation thereof, said speed change mechanism comprising a friction engagement element which is engaged and actuated by receiving a hydraulic force when the vehicle is started and sets a vehicle start stage;

wherein this transmission unit comprises pump impeller suction torque calculating means for calculating the pump impeller suction torque of said torque converter, and oil pressure supply control means that can set an increase ratio of the oil pressure supplied to said friction engagement element and wherein, when said engine is restarted from an engine stopped state and hydraulic fluid is supplied to said friction engagement element and said friction engagement element is engaged, said oil pressure supply control means conducts oil pressure supply at a first oil pressure increase ratio to said friction engagement element till the calculated pump impeller suction torque reaches a prescribed criterial value, and conducts oil pressure supply at a second oil pressure increase ratio which is less than said first oil pressure increase ratio from the instant said calculated pump impeller suction torque becomes higher than said prescribed criterial value.

2. The engine restart and vehicle start control apparatus in a transmission unit according to claim 1, comprising:

an oil pressure detector for detecting that the oil pressure supplied to said friction engagement element has become a prescribed low pressure, and wherein, when said engine is restarted from an engine stopped state and the vehicle start stage is set by supplying hydraulic fluid to said friction engagement element and engaging said friction engagement element, said oil pressure supply control means conducts a control conducting a rapid oil pressure supply to said friction engagement element till the oil pressure supplied to said friction engagement element detected by said oil pressure detector becomes the prescribed low pressure, and begins an oil pressure supply from said prescribed low pressure at said first oil pressure increase ratio to said friction engagement element from the instant said oil pressure detector detects that the oil pressure supplied to said friction engagement element has become the prescribed low pressure.

3. The engine restart and vehicle start control apparatus according to claim 2, wherein said control conducting said rapid oil pressure supply to said friction engagement element is conducted by setting a target supplied oil pressure of said oil pressure supply control means to a high pressure.

4. The engine restart and vehicle start control apparatus according to claim 2, wherein said control conducting said rapid oil pressure supply to said friction engagement element is begun when a prescribed job time elapses, even if the oil pressure supplied to said friction engagement element has not reached the prescribed low pressure.

5. The engine restart and vehicle start control apparatus in a transmission unit according to claim 1, comprising an input/output rotation speed difference detector for detecting the input/output rotation speed of said friction engagement element and calculating the difference between the input and output rotation speed, wherein, after the oil pressure supply at said second oil pressure increase ratio was begun, an oil pressure supply at a third oil pressure increase ratio which is lower than said second oil pressure increase ratio is begun from the instant the input/output rotation speed difference of said friction engagement element that was determined by said input/output rotation speed difference detector has become less than a prescribed value.

* * * * *